United States Patent
Fan et al.

(10) Patent No.: US 10,949,416 B2
(45) Date of Patent: Mar. 16, 2021

(54) WORKLOAD MANAGEMENT ACROSS MULTIPLE DATA SITES CAPABLE OF PROVIDING ACTIVE SERVICES

(71) Applicant: INTERNATIONAL BUSINESS MACHINES CORPORATION, Armonk, NY (US)

(72) Inventors: Si Bin Fan, Beijing (CN); Wei Liu, Beijing (CN); Mai Zeng, Beijing (CN); Wen Z. Liu, Beijing (CN); Wei Li, Beijing (CN); Yi J. Yj, Beijing (CN); Zhi D. Hao, Beijing (CN); Hong Tao Li, Beijing (CN); Jiong Fan, Shanghai (CN); Wei H. Liu, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 227 days.

(21) Appl. No.: 16/034,651

(22) Filed: Jul. 13, 2018

(65) Prior Publication Data
US 2020/0019631 A1    Jan. 16, 2020

(51) Int. Cl.
*G06F 16/23* (2019.01)
*G06F 16/27* (2019.01)

(52) U.S. Cl.
CPC ........ *G06F 16/2379* (2019.01); *G06F 16/273* (2019.01)

(58) Field of Classification Search
CPC ..... G06F 16/2379; G06F 16/273; G06F 16/27
See application file for complete search history.

(56) References Cited

U.S. PATENT DOCUMENTS

| 7,181,479 | B2  |   | 2/2007  | Suzuki et al. |             |
|-----------|-----|---|---------|---------------|-------------|
| 9,141,424 | B2  |   | 9/2015  | Bourbonnais et al. |        |
| 9,152,339 | B1  |   | 10/2015 | Cohen et al.  |             |
| 9,195,702 | B2  | * | 11/2015 | Bourbonnais   | G06F 16/2379 |
| 9,465,855 | B2  | * | 10/2016 | Bourbonnais   | G06F 11/3495 |
| 9,514,180 | B1  | * | 12/2016 | Cadarette     | G06F 16/2358 |
| 9,641,449 | B2  |   | 5/2017  | Anaya et al.  |             |

(Continued)

OTHER PUBLICATIONS

Active/Active Clustering Overview, http://help.sonicwall.com/help/sw/eng/6010/26/2/3/content/High_Availability.102.21.htm.

(Continued)

*Primary Examiner* — Jorge A Casanova
(74) *Attorney, Agent, or Firm* — Cantor Colburn LLP; William Kinnaman

(57) ABSTRACT

Systems, methods, and computer-readable media are described for implementing an active-active transaction protocol according to which multiple sites can each provide active services such as executing update transactions that insert, modify, or delete data records. An active-active transaction protocol utilizes affinity records corresponding to both transactions that have been received as well as the data records those transactions are updating to determine which site should handle execution of an incoming update transaction. An affinity record defines a relationship between a data record and a site that determines whether and where a transaction seeking to update that data record will be routed for processing. Conflict handling mechanisms are also provided by the active-active transaction protocol to ensure data consistency between the multiple sites.

20 Claims, 8 Drawing Sheets

(56) References Cited

U.S. PATENT DOCUMENTS

| | | | |
|---|---|---|---|
| 9,659,075 B2 | 5/2017 | Alewine et al. | |
| 9,727,624 B2 * | 8/2017 | Zhu | |
| 9,996,432 B2 * | 6/2018 | Misra | G06F 16/217 |
| 10,176,215 B2 * | 1/2019 | Eells | G06F 16/27 |
| 10,474,694 B2 * | 11/2019 | Bourbonnais | G06F 16/275 |
| 10,649,860 B2 * | 5/2020 | Sarafijanovic | G06F 11/1466 |
| 10,705,754 B2 * | 7/2020 | Cheng | G06F 3/067 |
| 2007/0174349 A1 | 7/2007 | Mitchell et al. | |
| 2008/0172419 A1 | 7/2008 | Richards et al. | |
| 2014/0237550 A1 | 8/2014 | Anderson et al. | |
| 2015/0058864 A1 | 2/2015 | Bourbonnais et al. | |
| 2016/0246867 A1 | 8/2016 | Bourbonnais et al. | |
| 2017/0010922 A1 | 1/2017 | Bourbonnais et al. | |
| 2018/0239536 A1 | 8/2018 | Koppolu et al. | |

OTHER PUBLICATIONS

Continuous Availability and Active/Active Replication Systems, 2018, 3 pages,https://shadowbasesoftware.com/solutions/business-continuity/continuous-availability/.

Enable Active/Active Architectures, 2018, 3 pages, http://www.scalearc.com/enable-active-active-architectures.

John Carl Villanueva, "Active-Active high availability cluster", Managed File Transfer and Network Solutions, Jun. 2015, 2 pages, http://www.jscape.com/blog/active-active-vs-active-passive-high-availability-cluster.

* cited by examiner

WORKLOAD MANAGEMENT ACROSS MULTIPLE DATA SITES CAPABLE OF PROVIDING ACTIVE SERVICES

BACKGROUND

The present invention relates generally to workload management, and more particularly, to workload management across multiple data sites.

Conventional workload management solutions for multiple sites such as multiple data centers utilize an active-query protocol according to which a particular site or sites provide exclusively active services such as an update service for a specific set of data and another site or sites provide exclusively a query service for the same set of data. These conventional workload management solutions, however, suffer from a number of drawbacks, technical solutions to which are described herein.

SUMMARY

In one or more example embodiments, a method for implementing an active-active transaction protocol for multiple sites is disclosed. The method includes receiving a transaction at a first transaction routing control layer associated with a first site. The transaction includes a modification to a first data record and a modification to a second data record, and the first data record and the second data record are each stored at the first site and a second site of the multiple sites. The method further includes determining that no affinity record exists for the first data record or the second data record and transferring a transaction control flow to a second transaction routing control layer associated with the second site. At the second site, a first affinity record corresponding to the first data record and the transaction and a second affinity record corresponding to the second data record and the transaction are generated and stored. The first affinity record and the second affinity record each point to the first site. The method then transfers the transaction control flow back to the first transaction routing control layer. At the first site, a third affinity record corresponding to the first data record and the transaction and a fourth affinity record corresponding to the second data record and the transaction are generated and stored. The third affinity record and the fourth affinity record also each point to the first site. The method additionally includes routing the transaction to a first transaction server associated with the first site to initiate execution of the transaction, executing, by the first transaction server, the transaction at least in part by instructing a database manager associated with the first site to modify the first data record and the second data record stored at the first site in accordance with the transaction, and replicating, by a back-end data replication component, the modifications to the first data record and the second data record stored at the first site to the first data record and the second data record stored at the second site.

In one or more other example embodiments, a system for implementing an active-active transaction protocol for multiple sites is disclosed. The system includes at least one memory storing computer-executable instructions and at least one processor, the at least one processor being configured to access the at least one memory and execute the computer-executable instructions to perform a set of operations. The operations include receiving a transaction at a first transaction routing control layer associated with a first site. The transaction includes a modification to a first data record and a modification to a second data record, and the first data record and the second data record are each stored at the first site and a second site of the multiple sites. The operations further include determining that no affinity record exists for the first data record or the second data record and transferring a transaction control flow to a second transaction routing control layer associated with the second site. At the second site, a first affinity record corresponding to the first data record and the transaction and a second affinity record corresponding to the second data record and the transaction are generated and stored. The first affinity record and the second affinity record each point to the first site. The operations then include transferring the transaction control flow back to the first transaction routing control layer. At the first site, a third affinity record corresponding to the first data record and the transaction and a fourth affinity record corresponding to the second data record and the transaction are generated and stored. The third affinity record and the fourth affinity record also each point to the first site. The operations additionally include routing the transaction to the first site to initiate execution of the transaction, executing the transaction at the first site at least in part by instructing a database manager associated with the first site to modify the first data record and the second data record stored at the first site in accordance with the transaction, and performing back-end data replication of the modifications to the first data record and the second data record stored at the first site to the first data record and the second data record stored at the second site.

In one or more other example embodiments, a computer program product for implementing an active-active transaction protocol for multiple sites is disclosed. The computer program product includes a non-transitory storage medium readable by a processing circuit, the storage medium storing instructions executable by the processing circuit to cause a method to be performed. The method includes receiving a transaction at a first transaction routing control layer associated with a first site. The transaction includes a modification to a first data record and a modification to a second data record, and the first data record and the second data record are each stored at the first site and a second site of the multiple sites. The method further includes determining that no affinity record exists for the first data record or the second data record and transferring a transaction control flow to a second transaction routing control layer associated with the second site. At the second site, a first affinity record corresponding to the first data record and the transaction and a second affinity record corresponding to the second data record and the transaction are generated and stored. The first affinity record and the second affinity record each point to the first site. The method then transfers the transaction control flow back to the first transaction routing control layer. At the first site, a third affinity record corresponding to the first data record and the transaction and a fourth affinity record corresponding to the second data record and the transaction are generated and stored. The third affinity record and the fourth affinity record also each point to the first site. The method additionally includes routing the transaction to a first transaction server associated with the first site to initiate execution of the transaction, executing, by the first transaction server, the transaction at least in part by instructing a database manager associated with the first site to modify the first data record and the second data record stored at the first site in accordance with the transaction, and replicating, by a back-end data replication component, the modifications to the first data record and the second data record stored at the first site to the first data record and the second data record stored at the second site.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
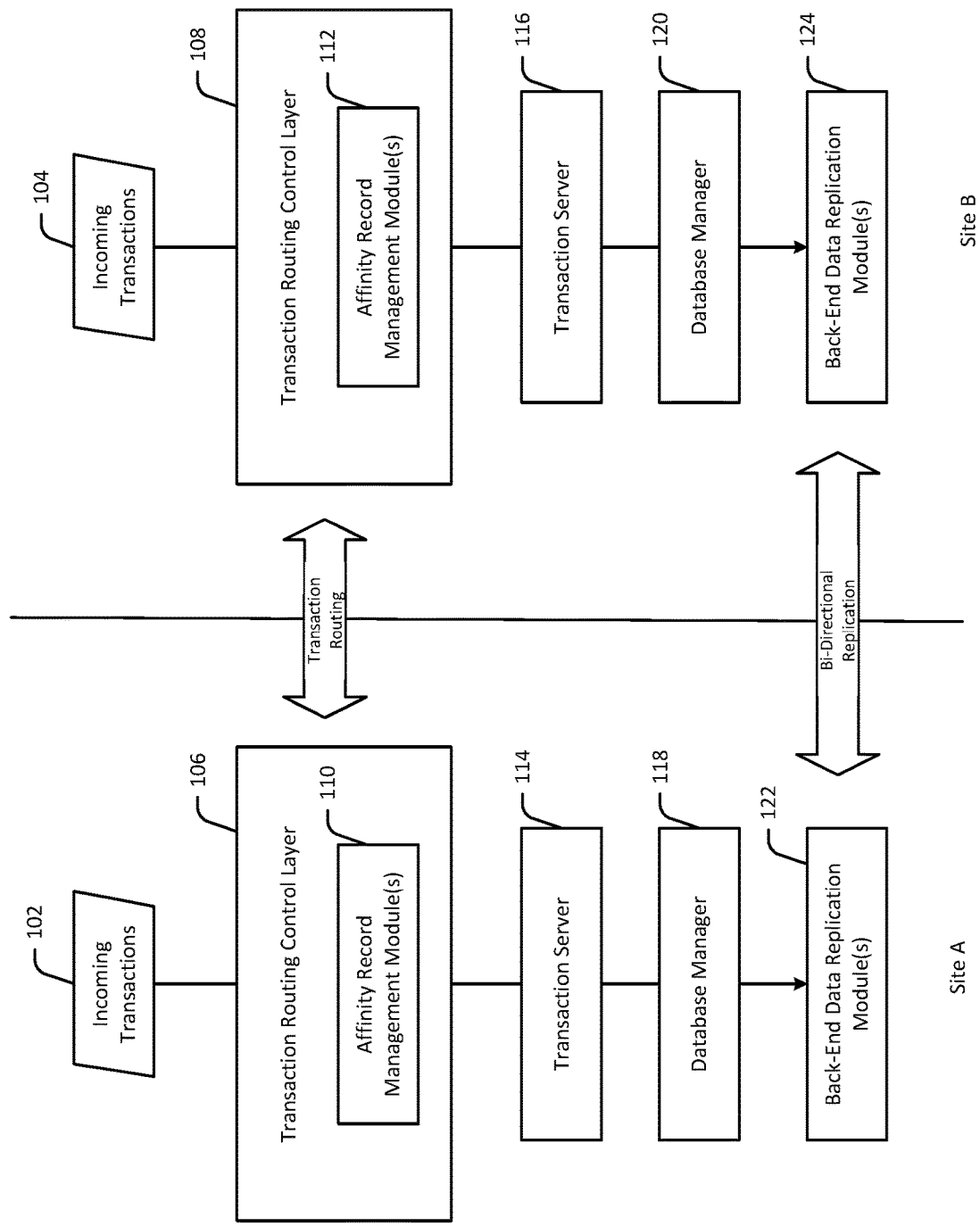
FIG. 1 is a schematic block diagram of an illustrative architecture for implementing an active-active transaction protocol in accordance with one or more example embodiments.

Example embodiments include, among other things, systems, methods, computer-readable media, techniques, and methodologies for implementing an active-active transaction protocol according to which multiple sites can each provide active services for a set of data such as executing update transactions that insert, modify, or delete data records. In addition, in example embodiments, each site is also capable of providing query services for the same set of data. According to example embodiments, a transaction received at a first site, for example, can be executed at the first site or at a different site. An active-active transaction protocol according to example embodiments utilizes affinity records corresponding to both transactions that have been received as well as to the data records those transactions are updating to determine which site should handle execution of an incoming update transaction. An affinity record defines a relationship between a data record and a site that determines whether and where a transaction seeking to update that data record will be routed for processing. In particular, in example embodiments, an affinity record points to the site designated for handling the transaction associated with the affinity record. It should be appreciated that while example embodiments are described herein in connection with two sites (e.g., a first site and a second site), such example embodiments are extendable to any number of sites. In addition, the term site may refer to a data center, server farm, or the like that includes one or more servers configured to implement an active-active transaction protocol in accordance with example embodiments.

In example embodiments, when an update transaction that updates a data record is received at a first site, a check is performed at the first site to determine whether an affinity record exists that corresponds to that data record. In example embodiments, an affinity record is determined to exist if it is stored in a transaction routing table and has not been discarded. An affinity record may have been previously generated in response to receipt of a prior transaction that updated the same data record. The existing affinity record may point to the first site or a second different site depending on which site defines the affinity relationship. In response to determining that an affinity record already exists for the data record, the first site then determines which site the existing affinity record points to.

If the affinity record points to the first site, the first site transfers control to a second site, which in turn, creates a new affinity record corresponding to the received transaction and the data record that it updates. In example embodiments, the new affinity record created at the second site points to the first site because the existing affinity record for the same data record points to the first site. The second site then transfers transaction control flow back to the first site, which generates a new affinity record at the first site. This new affinity record corresponds to the received transaction and the data record that it updates and points to the first site. The transaction is then executed at the first site and the update to the data record is duplicated to a corresponding data record stored at the second site.

On the other hand, if the existing affinity record for the data record points to the second site, the first site generates a new affinity record for the data record. The new affinity record corresponds to the received transaction and the data record and points to the second site based on the existing affinity record pointing to the second site. The first site then sends the transaction to the second site for further processing and execution. The further processing and execution performed at the second site includes generating a new affinity record at the second site, executing the transaction, and duplicating the update to the data record to a corresponding data record stored at the first site.

Still referring to the example embodiment in which an update transaction that updates a data record is received at a first site, if no affinity record for the data record is located, the first site may define the affinity relationship for the data record. In particular, a similar transaction control flow is followed as that described above in the example scenario in which an existing affinity record for the data record is located and points to the first site. More specifically, the first site transfers control to a second site, which in turn, creates an affinity record corresponding to the received transaction and the data record that it updates. In example embodiments, the affinity record created at the second site points to the first site because the first site is defining the affinity relationship for the data record. The second site then transfers transaction control flow back to the first site, which generates an affinity record at the first site. This affinity record corresponds to the received transaction and the data record that it updates and points to the first site. The transaction is then executed at the first site and the update to the data record is duplicated to a corresponding data record stored at the second site.

In example embodiments, an active-active transaction protocol also provides a mechanism for handling target site conflicts between affinity records. In an example conflict scenario, an update transaction is received at a particular site (e.g., a first site). The update transaction updates a first data record and a second data record. The first site performs an affinity record check and locates respective existing affinity records for the first data record and the second data record. If the existing affinity record for the first data record points to the first site, but the existing affinity record for the second data record points to a different site (e.g., a second site), or vice versa, a target site conflict exists. Example embodiments include various alternative mechanisms for handling such a conflict, which will be described in more detail later in this disclosure.

An active-active transaction protocol in accordance with example embodiments provides a number of technical effects and benefits over conventional transaction routing protocols. In particular, an active-active transaction protocol in accordance with example embodiments enables each site of multiple different sites to provide active services such as executing update transactions without requiring a site switch and without resulting in data loss or data confusion. That is, in accordance with example embodiments, no site needs to route a received update transaction to another site because it cannot provide update services. Rather, in accordance with an active-active transaction protocol of example embodiments, an affinity relationship is defined and corresponding affinity records are generated for a data record. These affinity records are used to determine which site will execute a given update transaction that seeks to update the data record. Thus, in accordance with the active-active transaction protocol of example embodiments, any site is capable of executing an update transaction, but executes only those transactions that update data records that correspond to existing affinity records that point to the site or for which no affinity records are located, and sends received transactions to a different site for execution if they update data records that correspond to existing affinity records that point to the different site. In this manner, example embodiments represent a true active-active solution that achieves a technical effect and benefit over conventional solutions where only certain sites are capable of providing active services. This technical effect of the active-active solution disclosed herein constitutes an improvement to computer technology, specifically, an improvement to computer-based transaction execution protocol technology. In particular, if the active-active transaction protocol of example embodiments is implemented, when a particular site goes down, there is no performance degradation or transaction downtime because any other site is capable of executing transactions that may have otherwise been handled by the site that is down. This constitutes an improvement to computer technology.

Various illustrative methods and corresponding data structures associated therewith will now be described. It should be noted that each operation of any of the methods 400-600 may be performed by one or more of the program modules or the like depicted in FIG. 1-3 or 7, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 2:
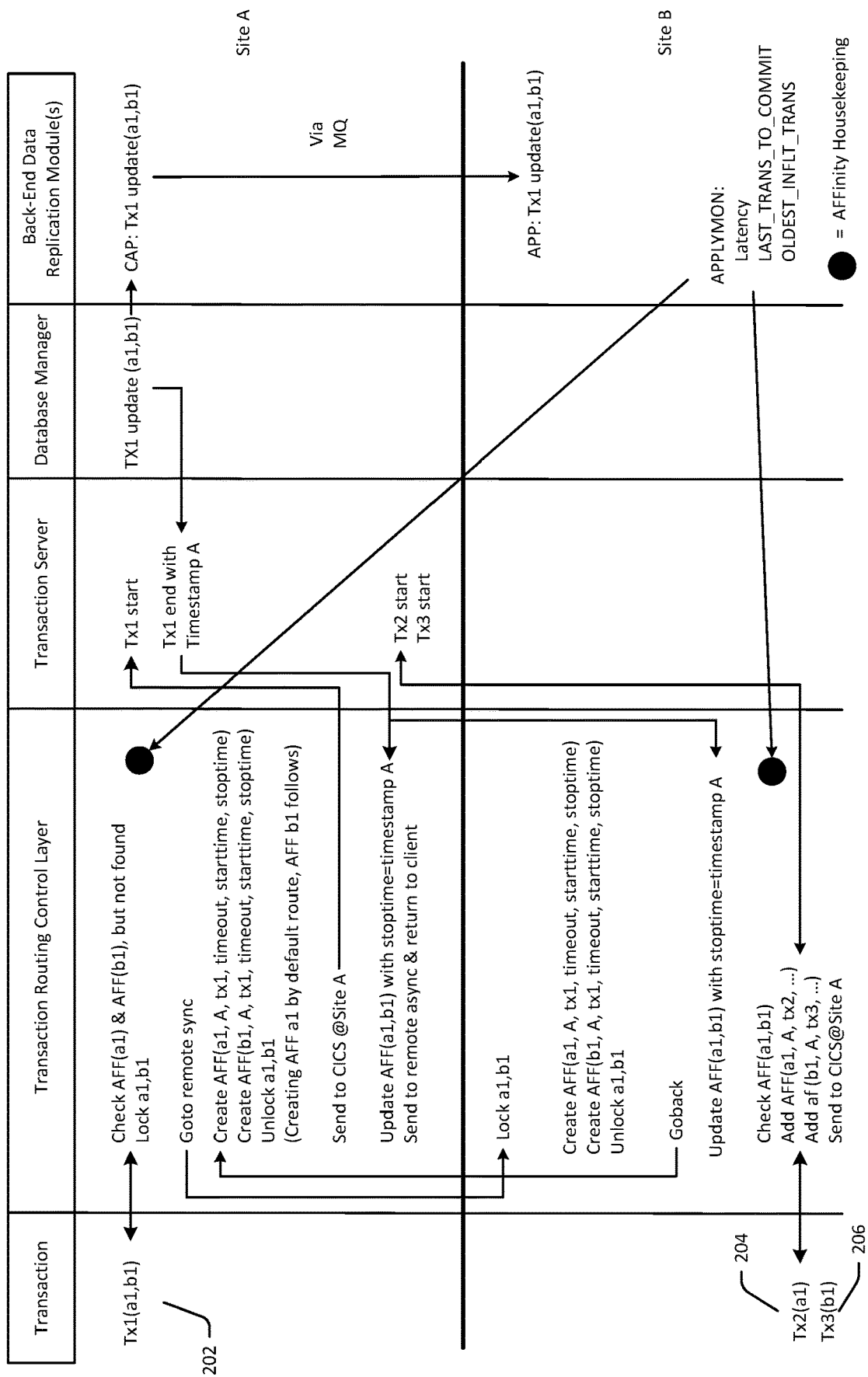
FIG. 2 is a data flow and timing diagram illustrating transaction control flow among components of the illustrative architecture of FIG. 1 in connection with the implementation of an active-active transaction protocol in accordance with one or more example embodiments.
Figure 4A:
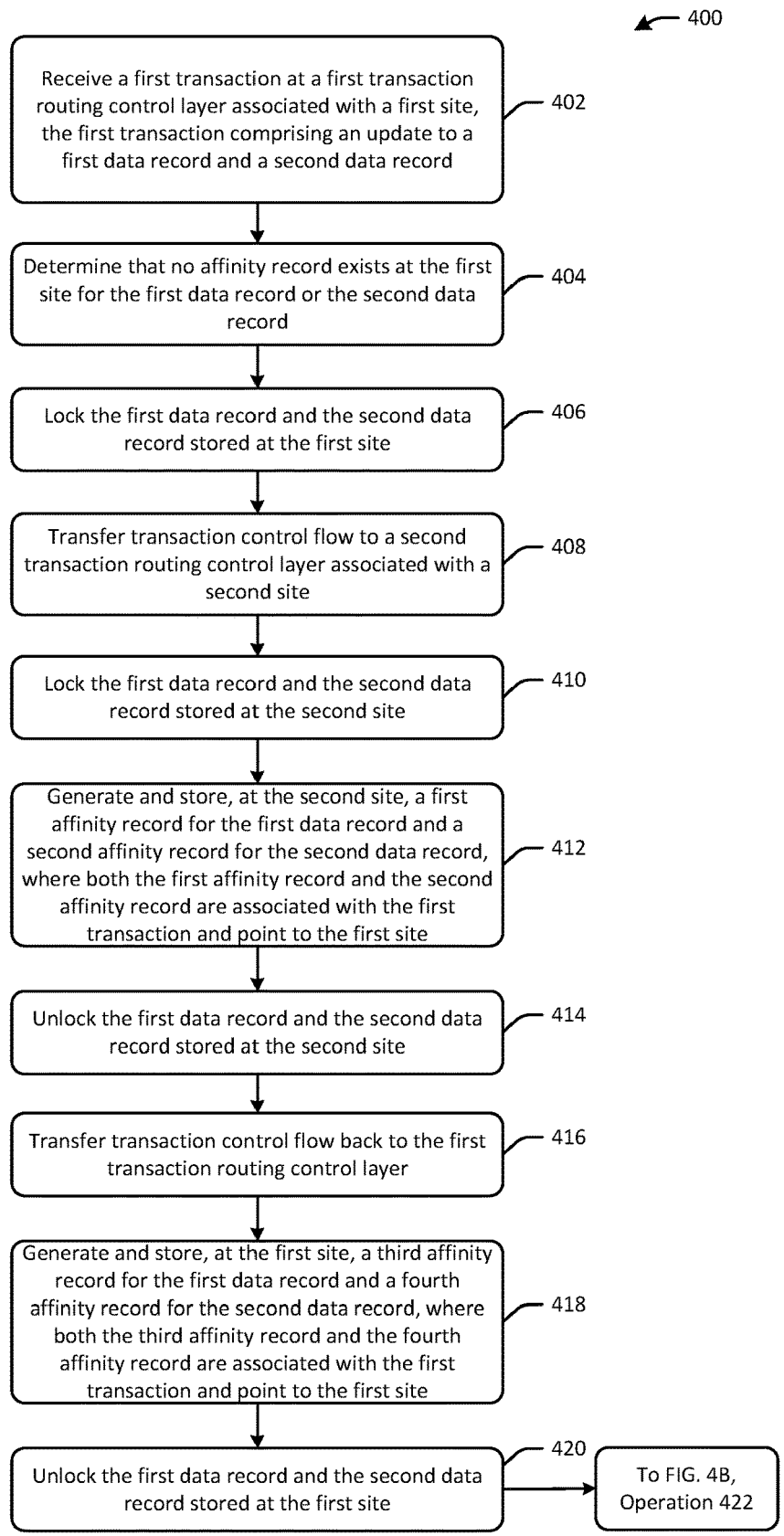
FIGS. 4A-4B are process flow diagrams of an illustrative method for implementing an active-active transaction protocol at least in part by creating and updating affinity records in accordance with one or more example embodiments.
Figure 4B:
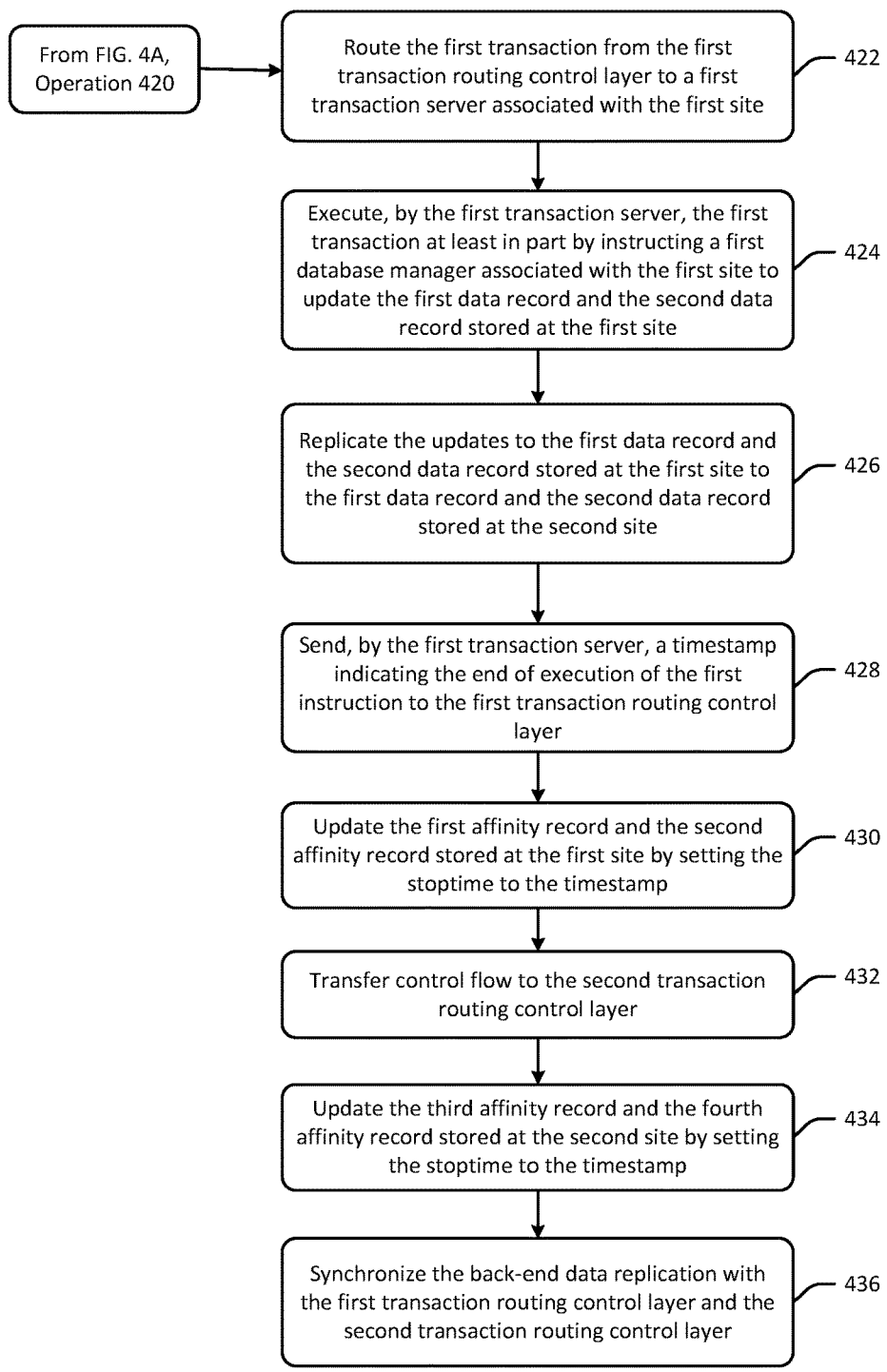

FIG. 1 is a schematic block diagram of an illustrative architecture for implementing an active-active transaction protocol in accordance with one or more example embodiments. FIG. 2 is a data flow and timing diagram illustrating transaction control flow among components of the illustrative architecture of FIG. 1 in connection with the implementation of an active-active transaction protocol in accordance with one or more example embodiments. FIGS. 4A-4B are process flow diagrams of an illustrative method 400 for implementing an active-active transaction protocol at least in part by creating and updating affinity records in accordance with one or more example embodiments. The illustrative method 400 depicted in FIGS. 4A and 4B will now be described in conjunction with FIGS. 1 and 2.

FIG. 1 illustratively depicts an example architecture at each of two sites (Site A and Site B) configured to enable an active-active transaction protocol in accordance with example embodiments. While two sites are illustratively depicted, it should be appreciated that the architecture depicted for Site A or Site B can be implemented at any number of sites to enable the active-active transaction protocol across all such sites. The architecture at Site A, for example, includes a transaction routing control layer 106, a transaction execution component 114 such as one or more transaction servers 114, a database manager 118 (e.g., a database management system (DBMS)), and one or more back-end data replication modules 122. The transaction routing control layer 106 includes one or more affinity record management modules 110. Similarly, the architecture at Site B, for example, includes a transaction routing control layer 108, a transaction execution component 116 such as one or more transaction servers 116, a database manager 120 (e.g., a DBMS), and one or more back-end data replication modules 124. The transaction routing control layer 108 includes one or more affinity record management modules 112.

In accordance with example embodiments, each of the first transaction routing control layer 106 and the second transaction routing control layer 108 are configured to receive respective incoming transactions 102 and 104 and route the transactions for execution at their site or to the other transaction routing control layer for execution at the other site. Further, the back-end data replication module(s) 122 and the back-end data replication module(s) 124 are configured to communicate with one another to replicate updates to data records made at one site to the other site.

Referring now to FIG. 4A in conjunction with FIGS. 1 and 2, in an example embodiment, the first transaction routing control layer 106 receives, at block 402 of the method 400, a first transaction 202 (which may be among the incoming transactions 102 received by the first transaction routing control layer 106). The first transaction 202 updates data records a1 and b1 and is illustratively represented as Tx1 (a1,b1). At block 404 of the method 400, the first transaction routing control layer 106 performs a check to determine if an affinity record exists for the first data record a1 or if an affinity record exists for the second data record b1. The first transaction routing control layer 106 may perform this check by querying the affinity record management module(s) 110 to perform a lookup of a transaction routing table containing existing affinity records that have not yet been discarded. An affinity record may remain in the transaction routing table until back-end data replication is completed (i.e., updates made to a data record at a given site are duplicated at the other site), at which point, it may be discarded.

In this example embodiment, at block 404, the first transaction routing control layer 106 determines that no affinity record exists at Site A for the first data record a1 or the second data record b1. Then, at block 406 of the method 400, the first transaction routing control layer 106 locks the first data record a1 and the second data record b1 stored at Site A, and at block 408 of the method 400, transfers transaction control flow to the second transaction routing control layer 108 of Site B.

Upon receipt of the transaction control flow, the second transaction routing control layer 108, locks the first data record a1 and the second data record b1 stored at Site B, at block 410 of the method 400. Then, at block 412 of the method 400, computer-executable instructions of the affinity record management module(s) 112 of the second transaction routing control layer 108 are executed to generate and store, at Site B, a first affinity record for the first data record a1 and a second affinity record for the second data record b1, where both the first affinity record and the second affinity record are each associated with the first transaction 202 and point to Site A.

In general, each affinity record identifies a transaction; a data record updated by that transaction; a site pointed to by the affinity record (which indicates the site designated to handle execution of the transaction); and various other transaction attributes such as whether the transaction has timed out, a start time of execution of the transaction, and a stop time of execution of the transaction. Referring to the illustrative example depicted in FIG. 2, assuming that the first transaction is Tx1(a1,b1), the first affinity record generated at Site B is represented as AFF(a1, A, tx1, timeout, start time, stop time) and the second affinity record generated at Site B is represented as AFF(b1, A, tx1, timeout, start time, stop time). Thus, each of the first affinity record and the second affinity record point to Site A as the site to handle execution of Tx1 because Tx1 was initially received at the first transaction routing control layer 106 of Site A and no existing affinity records were located for data records a1 and b1.

Referring again to FIG. 4A, at block 414 of the method 400, the second transaction routing control layer 108 unlocks the first data record a1 and the second data record b1, and at block 416 of the method 400, transfers transaction control flow back to the first transaction routing control layer 106. At block 418 of the method 400, computer-executable instructions of the affinity record management module(s) 110 of the first transaction routing control layer 106 are executed to generate and store, at Site A, a third affinity record for the first data record a1 and a fourth affinity record for the second data record b1, where the third affinity record and the fourth affinity record are each associated with the first transaction 202 and point to Site A. Then, at block 420 of the method 400, the first transaction routing control layer 106 unlocks the first data record a1 and the second data record b1.

Referring again to the example depicted in FIG. 2, the third affinity record generated at Site A for Tx1(a1,b1) is represented as AFF(a1, A, tx1, timeout, start time, stop time) and the fourth affinity record generated at Site A is represented as AFF(b1, A, tx1, timeout, start time, stop time). It should be appreciated that the modifiers used herein (e.g., "first," "second," "third," etc.) in connection with affinity records are not intended to indicate a number of affinity records that may be stored at Site A or at Site B, but rather to distinguish one affinity record from another as well as to distinguish affinity records generated and stored at one site from affinity records generated and stored at another site.

Referring now to FIG. 4B, at block 422 of the method 400, the first transaction routing control layer 106 routes the first transaction 202 (e.g., Tx1(a1,b1)) to the transaction server 114 associated with Site A. At block 424 of the method 400, the transaction server 114 initiates execution of the first transaction 202 at least in part by instructing a database manager 118 to update the first data record a1 and the second data record b1 in accordance with the first transaction 202.

At block 426 of the method 400, the back-end replication module(s) 122 capture the updates made to the first data record a1 and the second data record b1 at Site A as a result of execution of the first transaction 202 at Site A and communicates with the back-end data replication module(s) 124 of Site B to replicate the updates to the first data record a1 and the second data record b1 stored at Site B. In example embodiments, a transaction is deemed completed when the data replication is complete and updates made to data record(s) at one site are duplicated with respect to corresponding data records maintained at another site.

At block 428 of the method 400, the transaction server 114 sends a timestamp indicating a time at which execution of the first transaction 202 is complete to the first transaction routing control layer 106. At block 430 of the method 400, the affinity record management module(s) 110 update the third affinity record (e.g., AFF(a1, A, tx1, timeout, start time, stop time)) and the fourth affinity record (e.g., AFF(b1, A, tx1, timeout, start time, stop time)) stored at Site A by setting the stop time parameters of these affinity records to the timestamp value. Then, at block 432 of the method 400, the first transaction routing control layer 106 transfers transaction control flow once again to the second transaction routing control layer 108 to enable the affinity record management module(s) 112 at Site B to update the first affinity record (e.g., AFF(a1, A, tx1, timeout, start time, stop time)) and the second affinity record (e.g., AFF(b1, A, tx1, timeout, start time, stop time)) stored at Site B by setting the stop time parameters of these affinity records to the timestamp, at block 434 of the method 400.

Finally, at block 436 of the method 400, the back-end data replication is synchronized with the first transaction routing control layer 106 and the second transaction routing control layer 108 as part of an affinity record housekeeping task. More specifically, at block 436 of the method 400, the first transaction control layer 106 and the second transaction control layer 108 query a back-end replication component to determine if the first transaction 202 has been committed, that is, if the updates to data records a1 and b1 made at Site A have been replicated to corresponding data records stored at Site B. In accordance with example embodiments, the back-end replication component may respond to the query by providing a latency associated with replicating the data record updates of the first transaction 202 to Site B; an indication of the last transaction to be committed; an indication of the oldest in-flight transaction (e.g., oldest transaction still in the process of being committed); and so forth. In certain example embodiments, the back-end replication component includes the back-end data replication module(s) 122 and the back-end data replication module(s) 124, and the first transaction routing control layer 106 and the second transaction routing control layer 108 query their respective back-end data replication module(s) 122, 124. In other example embodiments, both the first transaction routing control layer 106 and the second transaction routing control layer 108 each query the back-end data replication module(s) 124 of Site B because Site B is the site at which the updates to data records a1 and are replicated. Upon the first transaction routing control layer 106 receiving an indication that the first transaction 202 has committed, the affinity record management module(s) 110 at Site A are executed to discard the third affinity record and the fourth affinity record previously generated at Site A. Similarly, upon the second transaction routing control layer 108 receiving an indication that the first transaction 202 has committed, the affinity record management module(s) 112 at Site B are executed to discard the first affinity record and the second affinity record previously generated at Site B.

Figure 5:
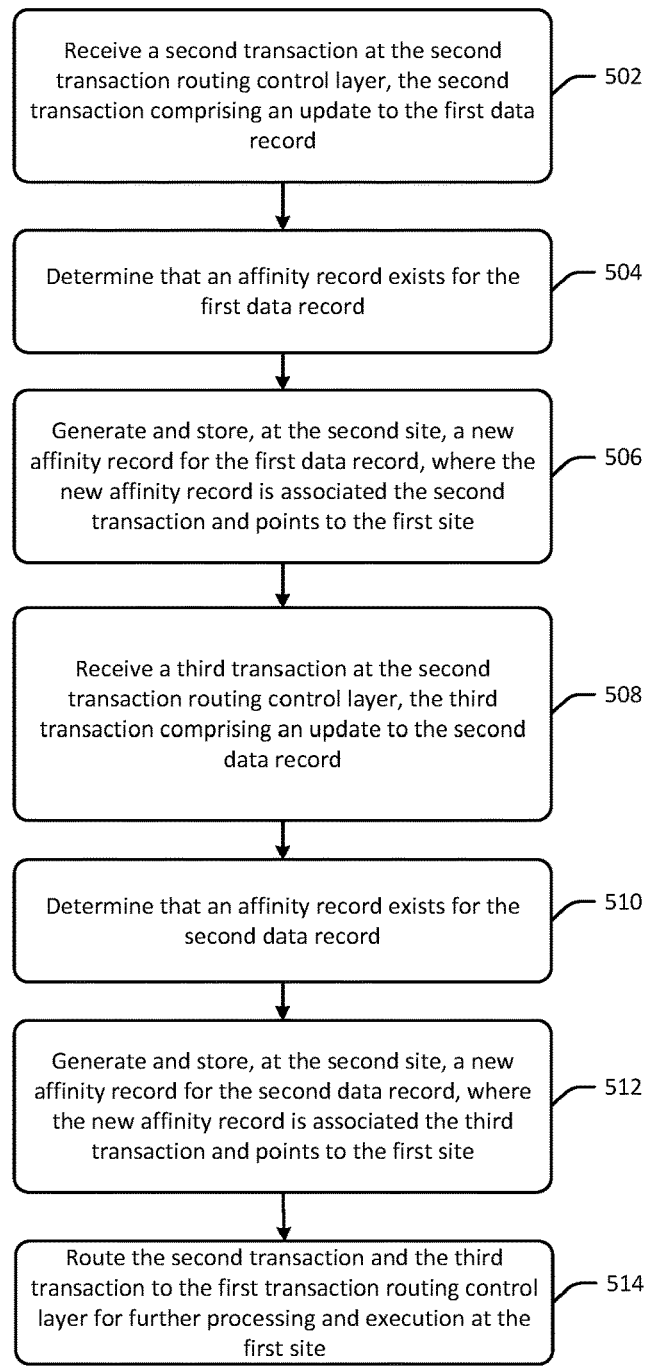
FIG. 5 is a process flow diagram of an illustrative method for receiving transactions at a particular site and routing the transactions to a different site for processing based on existing affinity records that point to the different site in accordance with one or more example embodiments of the disclosure.

FIG. 5 is a process flow diagram of an illustrative method 500 for receiving transactions at a particular site and routing the transactions to a different site for processing based on existing affinity records that point to the different site in accordance with one or more example embodiments of the disclosure. The illustrative method is described assuming that the method 400 has already been performed.

Referring now to FIG. 5 in conjunction with FIGS. 1 and 2, at block 502 of the method 500, the second transaction routing control layer 108 receives a second transaction 204 that includes an update to the first data record a1 referenced in the illustrative method 400. Referring again to the illustrative example depicted in FIG. 2, the second transaction 204 is represented as Tx2(a1). At block 504 of the method 500, the second transaction routing control layer 108 queries the affinity record management module(s) 112 and determines that an affinity record exists for the first data record a1. The affinity record determined to exist at block 504 is the first affinity record referenced in the method 400, for example, the affinity record AFF(a1, A, tx1, . . . ) stored at Site B in the illustrative example of FIG. 2.

At block 506 of the method 500, the affinity record management module(s) 112 generate and store, at Site B, a new affinity record for the first data record a1. The new affinity record corresponds to the second transaction 204 and points to Site A. The new affinity record generated and stored at block 506 is illustratively represented as AFF(a1, A, tx2, . . . ) in FIG. 2. In particular, the existing affinity record AFF(a1, A, tx1, . . . ) for the first data record a1 defines the affinity relationship between site A and the data record a1 as long as the affinity record has not been discarded. As such, new affinity records generated for the first data record a1 also point to Site A as long as the existing affinity record AFF(a1, A, tx1, . . . ) has not been discarded.

At block 508 of the method 500, the second transaction routing control layer 108 receives a third transaction 206 that includes an update to the second data record b1 referenced in the illustrative method 400. The second transaction 204 and the third transaction 206 may be among the incoming transactions 104 received by the second transaction routing control layer 108. Referring again to the illustrative example depicted in FIG. 2, the third transaction 206 is represented as Tx3(b1). At block 510 of the method 500, the second transaction routing control layer 108 queries the affinity record management module(s) 112 and determines that an affinity record exists for the second data record b1. The affinity record determined to exist at block 510 is the second affinity record referenced in the method 400, for example, the affinity record AFF(b1, A, tx1, . . . ) stored at Site B in the illustrative example of FIG. 2.

At block 512 of the method 500, the affinity record management module(s) 112 generate and store, at Site B, a new affinity record for the second data record b1. The new affinity record corresponds to the third transaction 206 and points to Site A. The new affinity record generated and stored at block 512 is illustratively represented as AFF(b1, A, tx3, . . . ) in FIG. 2. In particular, the existing affinity record AFF(b1, A, tx1, . . . ) for the second data record b1 defines the affinity relationship between site A and the data record b1 as long as the affinity record has not been discarded. As such, new affinity records generated for the second data record b1 also point to Site A as long as the existing affinity record AFF(b1, A, tx1, . . . ) has not been discarded.

Finally, at block 514 of the method 500, the second transaction routing control layer 108 routes the second transaction 204 and the third transaction 206 to the first transaction routing control layer 106 for further processing and execution at Site A. The further processing and execution performed at Site A includes generating new affinity records that correspond to the second transaction 204 and the third transaction 206, respectively, and that correspond to the first data record a1 and the second data record b1, respectively. The processing and execution performed at Site A further includes executing the second transaction 204 and the third transaction 206 and replicating the updates to the first data record a1 and the second data b1 to corresponding data records stored at Site B.

Figure 3:
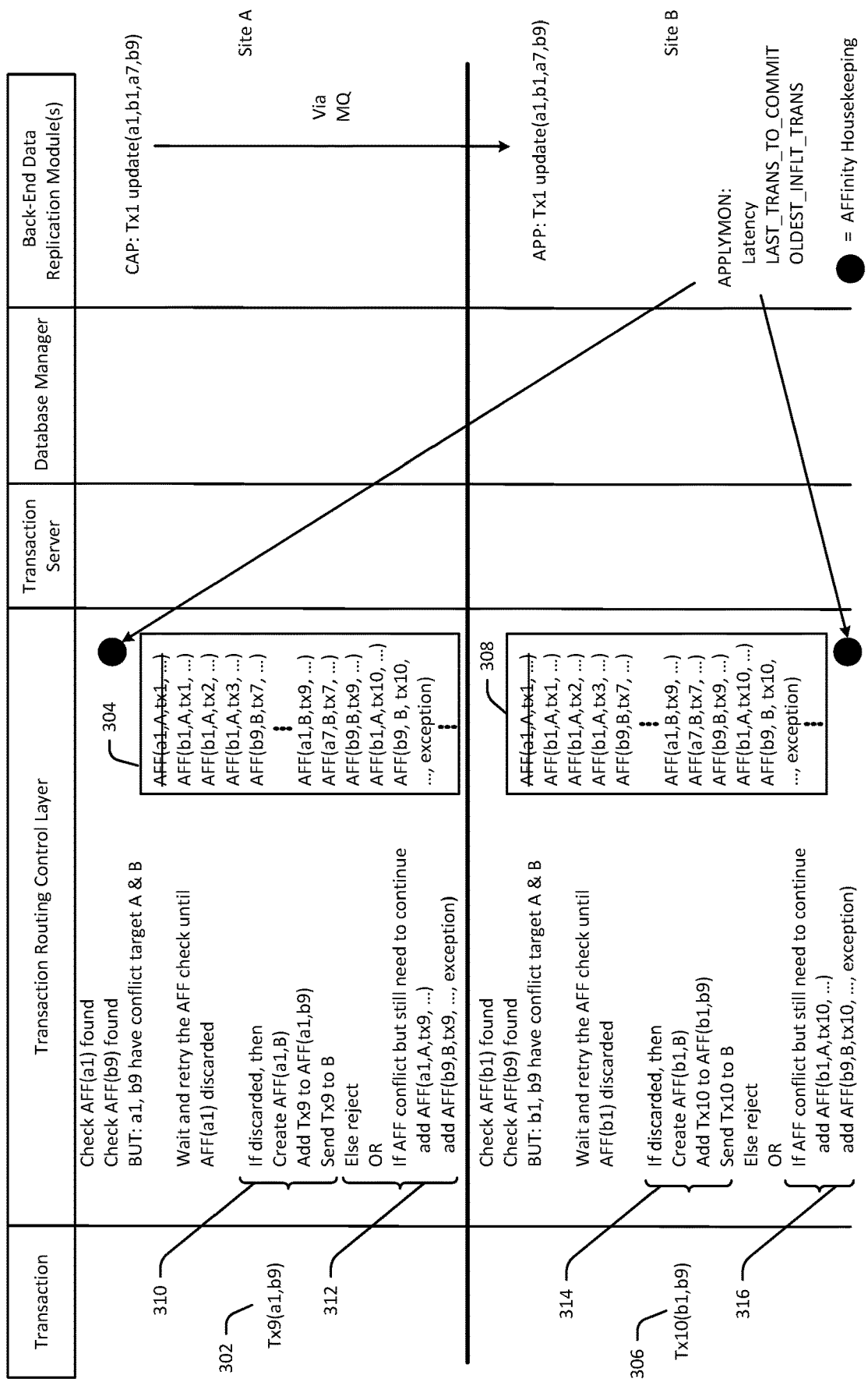
FIG. 3 is a data flow and timing diagram illustrating transaction control flow among components of the illustrative architecture of FIG. 1 for handling conflicts in connection with the implementation of an active-active transaction protocol in accordance with one or more example embodiments.
Figure 6:
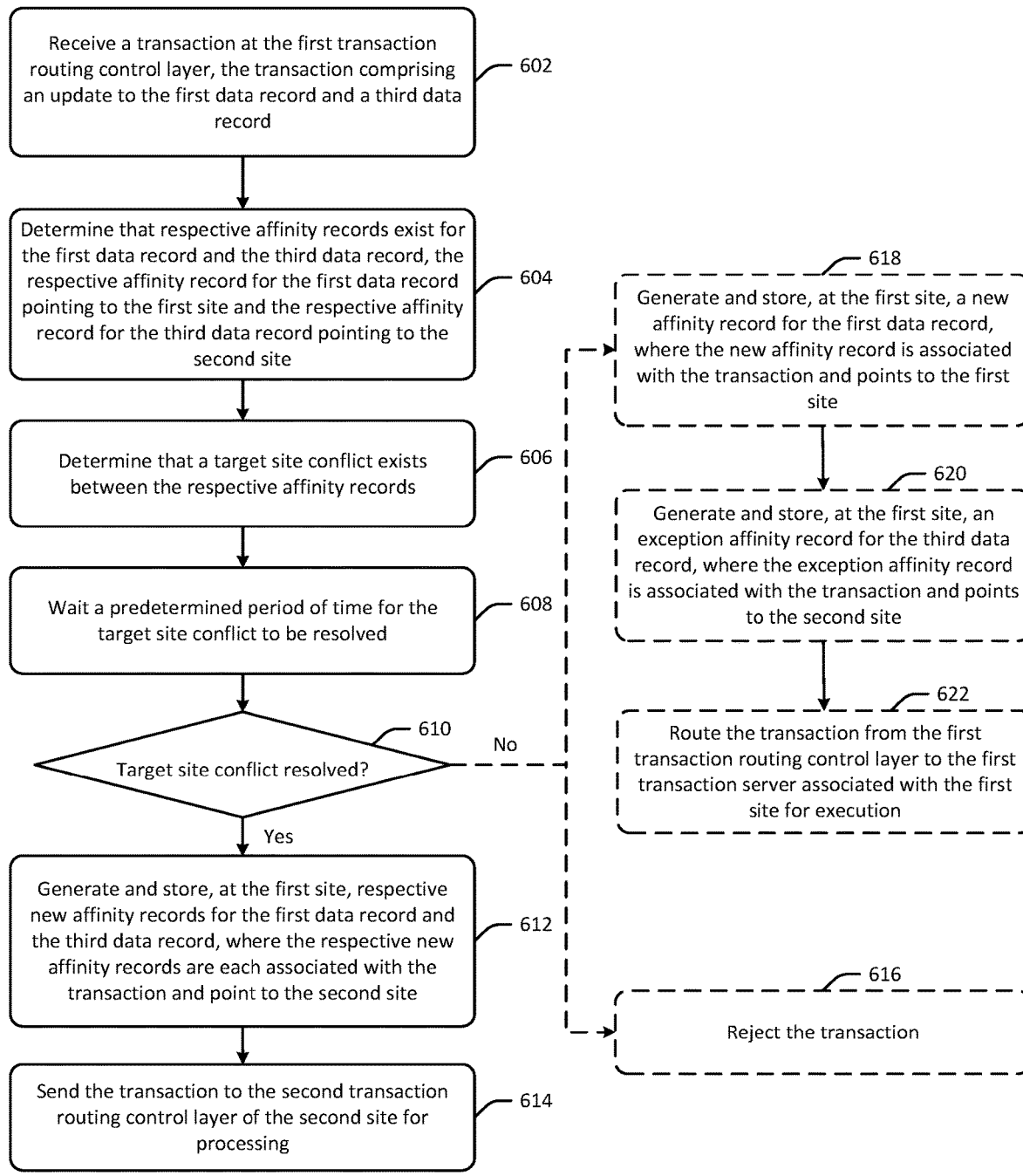
FIG. 6 is a process flow diagram of an illustrative method for handling conflicts in connection with the implementation of an active-active transaction protocol in accordance with one or more example embodiments.

FIG. 3 is a data flow and timing diagram illustrating transaction control flow among components of the illustrative architecture of FIG. 1 for handling conflicts in connection with the implementation of an active-active transaction protocol in accordance with one or more example embodiments. FIG. 6 is a process flow diagram of an illustrative method 600 for handling conflicts in connection with the implementation of an active-active transaction protocol in accordance with one or more example embodiments. FIG. 6 will be described in conjunction with FIGS. 1 and 3 hereinafter.

Referring now to FIG. 6 in conjunction with FIGS. 1 and 3, at block 602 of the method 600, the first transaction routing control layer 106 receives a fourth transaction 302 that includes an update to the first data record a1 and a third data record b9, for example. The fourth transaction 302 is illustratively represented in FIG. 3 as Tx9(a1,b9). It should be appreciated that the modifier "fourth" is used here merely distinguish the transaction 302 from the first, second, and third transactions previously referenced. The fourth transaction 302 may actually be the Xth transaction (e.g., the ninth transaction in the illustrative example of FIG. 3) received by the first transaction routing control layer 106. Similarly, the modifier "third" is used herein merely to distinguish the data record b9 from the data records a1 and b1 previously referenced, but may not actually represent the third data record updated at Site A.

At block 604 of the method 600, the first transaction routing control layer 106 queries the affinity record management module(s) 110 to determine that respective affinity records exist for the first data record a1 and the third data record b9, where the respective affinity record for the first data record a1 points to Site A and the respective affinity record for the third data record b9 points to Site B. At block 606 of the method 600, the first transaction routing control layer 106 determines that a target site conflict exists between the respective affinity records because they point to different sites.

In particular, at block 604, the first transaction routing control layer 106 queries the affinity record management module(s) 110, which in turn, perform a lookup of a transaction routing table 304 and locate respective existing affinity records for the first data record a1 and the third data record b9. The respective affinity records are illustratively represented in the transaction routing table 304 of FIG. 3 as AFF(a1, A, tx1, . . . ) and AFF(b9, B, tx7, . . . ). In accordance with example embodiments, the affinity records AFF(a1, A, tx1, . . . ) and AFF(b9, B, tx7, . . . ) are also represented in a transaction routing table 308 associated with Site B because, as previously noted, any time a transaction is received (except in some scenarios involving a target site conflict), affinity records associated with the transaction are generated and maintained (until discarded) at each site.

The affinity record AFF(a1, A, tx1, . . . ) was generated in response to receipt of the first instruction 202 (e.g., Tx1(a1, b1)) by the first transaction routing control layer 106 and the affinity record AFF(b9, B, tx7, . . . ) may have been generated in response to receipt of a prior transaction (e.g., Tx7) by the second transaction routing control layer 108 or in response to receipt of the prior transaction by the first transaction routing control layer 106 (if an existing affinity record for the third data record b9 that points to Site B is located). Because the existing affinity records AFF(a1, A, tx1, . . . ) and AFF(b9, B, tx7, . . . ) for data records a1 and b9, respectively, point to different sites, a target site conflict is determined to exist.

At block 608 of the method 600, the first transaction routing control layer 106 waits a predetermined period of time for the target site conflict to be resolved. Then, at block 610 of the method 600, the first transaction routing control layer 106 determines whether the target site conflict has been resolved by querying the affinity record management module(s) 110 to perform a lookup of the transaction routing table 304 to determine whether one or both of the affinity records AFF(a1, A, tx1, . . . ) and AFF(b9, B, tx7, . . . ) have been discarded from the routing table 304. In particular, the target site conflict is resolved if either the update to data record a1 made as a result of execution of Tx1 has been successfully replicated to Site B and the corresponding affinity record AFF(a1, A, tx1, . . . ) has been discarded or the update to data record b9 made as a result of execution of Tx7 has been successfully replicated to Site A and the corresponding affinity record AFF(b9, B, tx7, . . . ) has been discarded.

In response to a positive determination at block 610, computer-executable instructions of the affinity record management module(s) 110 are executed at block 612 of the method 600 to generate and store, at Site A, respective new affinity records for the first data record a1 and the third data record b9, where the respective new affinity records are each associated with the fourth transaction 302 (e.g., Tx9(a1,b9)) and point to Site B. The respective new affinity records are illustratively represented as AFF(a1, B, tx9, . . . ) and AFF(b9, BG, tx9, . . . ) in the transaction routing tables 304 and 308. The respective new affinity records generated and stored at block 612 point to Site B because it is assumed that Tx1 completes execution and data replication before Tx7, and thus, that the target site conflict has been resolved by discarding of the affinity record AFF(a1, A, tx1, . . . ). The discarding of AFF(a1, A, tx1. . . . ) from the transaction routing tables 304, 308 is illustratively depicted using a strikethrough in FIG. 3. If, however, Tx7 completes execution and data replication before Tx1, then the target site conflict would be resolved by discarding the affinity record AFF(b9, B, tx7, . . . ), in which case, the new affinity records generated and stored at block 612 would point to Site A. The generation of affinity records AFF(a1, B, tx9, . . . ) and AFF(b9, B, tx9, . . . ) based on the discarding of affinity record AFF(a1, A, tx1. . . . ) is illustratively represented in FIG. 3 by pseudo-code 310. The pseudo-code 312 is assumed not to be executed in this example scenario.

At block 614 of the method 600, the first transaction routing control layer 106 sends the fourth transaction 302 to the second transaction routing control layer 108 of Site B for further processing and execution. The further processing and execution performed by Site B includes generating respective new affinity records for the first data record a1 and the third data record b9 at Site B (e.g., AFF(a1, B, tx9, . . . ) and AFF(b9, BG, tx9, . . . )), executing the fourth transaction 302, and duplicating the update to data records a1 and b9 to corresponding data records stored at Site A.

On the other hand, in response to a negative determination at block 610 indicating that the target site conflict has not been resolved, various alternative process flows may occur. For ease of explanation, these alternative process flows that occur after the target site conflict is determined to still exist after waiting the predetermined period of time will be described in connection with a fifth transaction 306 illustratively represented as tx10(b1,b9) in FIG. 3. In this example scenario, it is assumed that: 1) tx9 has already been received at Site A, 2) a target site conflict was resolved by discarding of affinity record AFF(a1, A, tx1, . . . ), and 3) affinity records AFF(a1, B, tx9, . . . ) and AFF(b9, B, tx9, . . . ) have already been generated and stored in transaction routing tables 304, 308.

In an example embodiment, the method 600 is performed again with respect to the fifth transaction 306 (e.g., tx10(b1, b9)), which is received at the second transaction routing control layer 108 at block 602. At block 604, the second transaction routing control layer 108 queries the affinity record management module(s) 112 to perform a lookup of the transaction routing table 308 based on receipt of the fifth transaction 306, which locates existing affinity records AFF (b1, A, tx*, . . . ) and (AFF(b9, B, tx*, . . . ). AFF(b1, A, tx*, . . . ) may refer to existing affinity record AFF(b1, A, tx1, . . . ) or existing affinity record AFF(b1, A, tx2, . . . ). Similarly, (AFF(b9, B, tx*, . . . ) may refer to existing affinity record (AFF(b9, B, tx7, . . . ) or existing affinity record (AFF(b9, B, tx9, . . . ).

Then, at block 606, the affinity record management module(s) 112 determine that a target site conflict exists between the located affinity records AFF(b1, A, tx*, . . . ) and (AFF(b9, B, tx*, . . . ) and waits the predetermined period of time at block 608. At block 610, the affinity record management module(s) 112 determine whether the target site conflict still exists after waiting the predetermined period of time. With respect to the fifth transaction 306, it is assumed that the target site conflict has not been resolved, that is, a negative determination at block 610. In an example embodiment, the second transaction routing control layer 108 may simply reject the fifth transaction 306 at block 616 of the method 600, in which case, the fifth transaction 306 would need to be re-submitted.

Alternatively, in another example embodiment, in response to a negative determination at block 610, the method 600 may proceed to block 618, where computer-executable instructions of the affinity record management module(s) 112 are executed to generate and store, at Site B, a new affinity record for the second data record b1, where the new affinity record is associated with the fifth transaction 306 and points to Site A. This new affinity record for the second data record b1 is illustratively represented in FIG. 3 as AFF(b1, A, tx10, . . . ). In accordance with example embodiments, the second transaction routing control layer 108 determines that tx10 should be sent to Site A for further processing and execution in order to honor the affinity relationship that has already been defined between Site A and the second data record b1 based on the existing affinity record AFF(b1, A, tx*, . . . ). As a result, the affinity record AFF(b1, A, tx10, . . . ) is added to the transaction routing table 308 to indicate that tx10 should be sent to Site A based on the existing affinity relationship between Site A and the second data record b1.

In addition, at block 620 of the method 600, computer-executable instructions of the affinity record management module(s) 112 are executed to generate and store, at Site A, an exception affinity record for the third data record b9. The exception affinity record generated for the third data record b9 is associated with the fifth transaction 306, points to Site B rather than Site A, and includes an exception that indicates to the back-end replication component that there is a potential for data conflict between Site A and Site B with respect to the third data record b9. In particular, the exception affinity record AFF(b9, B, tx10, . . . , exception) is added to the transaction routing table 308 to indicate that tx10 is being sent to Site A based on the prior affinity relationship between Site A and data record b1 represented by affinity record AFF(b1, A, tx*, . . . ), but that b9 has been updated at Site B by another transaction and it is not known whether data replication to Site A in connection with that other transaction has finished. Thus, the (b9, B) portion of AFF (b9, B, tx10, . . . , exception) indicates that previously b9 was updating at Site B, and the (tx10, . . . , exception) portion indicates that tx10 is an exception to b9 because it has been routed to Site A. Referring to FIG. 3, the generation of affinity records AFF(b1, A, tx10, . . . ) and AFF(b9, B, tx10, . . . , exception) corresponds to the condition of pseudo-code 314 not being met. Thus, the pseudo-code 316 is assumed to be executed in this example scenario.

Based on the included exception in the affinity record AFF(b9, B, tx10, . . . , exception), the back-end data replication component knows that it must check to ensure that the third data record b9 is consistent between Site A and Site B. In certain example embodiments, the potential exception may not become an actual exception because Tx1 or Tx7 may complete execution prior to initiation of execution of Tx10 (as determined from the stop time parameter in corresponding affinity records being set to a timestamp indicative of completion of execution of the instructions). Finally, at block 622 of the method 600, the second transaction routing control layer 106 routes the fifth transaction 302 to the transaction server 114 for execution. As previously noted, prior to execution of tx10, the affinity records AFF(b1, A, tx10, . . . ) and AFF(b9, B, tx10, . . . , exception) may be added to the transaction routing table 304.

The illustrative method 600 indicates that, if a target site conflict exists, a transaction routing control layer waits a predetermined period of time for the conflict to be resolved. In certain example embodiments, however, a transaction routing control layer may simply reject the transaction immediately if a target site conflict is determined to exist without waiting for the conflict to be resolved. This may occur if, for example, the transaction is deemed to have a low level of importance. Further, in certain example embodiments, a transaction routing control layer may immediately generate the exception affinity record if a target site conflict is determined to exist. This may occur if, for example, the transaction is deemed a critical transaction.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 7:
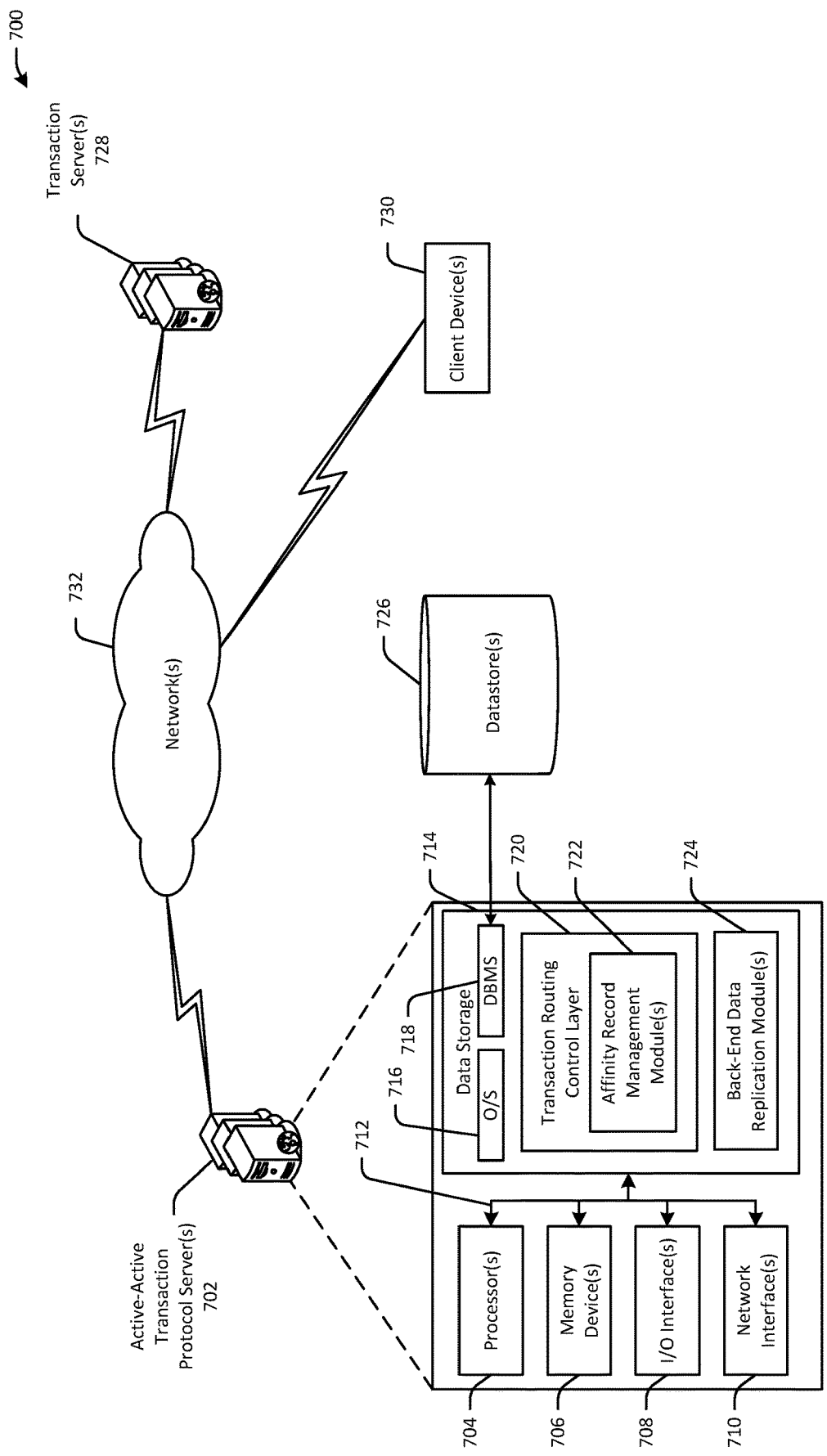
FIG. 7 is a schematic diagram of an illustrative networked architecture configured to implement one or more example embodiments.

FIG. 7 is a schematic diagram of an illustrative networked architecture 700 configured to implement one or more example embodiments. The example architecture 700 includes one or more active-active transaction protocol servers 702, one or more transaction servers 728, and one or more client devices 730. The client device(s) 730 may include any suitable device including, without limitation, a server, a personal computer (PC), a tablet, a smartphone, a wearable device, a voice-enabled device, or the like. The client device(s) 730 may be utilized by users to submit transactions to the active-active transaction protocol server(s) 702. While any particular component of the architecture 700 may be described herein in the singular, it should be appreciated that multiple instances of any such component may be provided, and functionality described in connection with a particular component may be distributed across multiple ones of such a component.

The active-active transaction protocol server 702, the transaction server 728, and the client device 730 may be configured to communicate with one another and, potentially, one or more other devices, systems, datastores, or the like via one or more networks 732. The network(s) 732 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the active-active transaction protocol server 702 may include one or more processors (processor(s)) 704, one or more memory devices 706 (generically referred to herein as memory 706), one or more input/output ("I/O") interface(s) 708, one or more network interfaces 710, and data storage 714. The active-active transaction protocol server 702 may further include one or more buses 712 that functionally couple various components of the active-active transaction protocol server 702.

The bus(es) 712 may include at least one of a system bus, a memory bus, an address bus, or a message bus, and may permit the exchange of information (e.g., data (including computer-executable code), signaling, etc.) between various components of the active-active transaction protocol server 702. The bus(es) 712 may include, without limitation, a memory bus or a memory controller, a peripheral bus, an accelerated graphics port, and so forth. The bus(es) 712 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 706 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 706 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 706 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 714 may include removable storage and/or non-removable storage including, but not limited to, magnetic storage, optical disk storage, and/or tape storage. The data storage 714 may provide non-volatile storage of computer-executable instructions and other data. The memory 706 and the data storage 714, removable and/or non-removable, are examples of computer-readable storage media (CRSM) as that term is used herein.

The data storage 714 may store computer-executable code, instructions, or the like that may be loadable into the memory 706 and executable by the processor(s) 704 to cause the processor(s) 704 to perform or initiate various operations. The data storage 714 may additionally store data that may be copied to memory 706 for use by the processor(s) 704 during the execution of the computer-executable instructions. Moreover, output data generated as a result of execution of the computer-executable instructions by the processor(s) 704 may be stored initially in memory 706 and may ultimately be copied to data storage 714 for non-volatile storage.

More specifically, the data storage 714 may store one or more operating systems (O/S) 716; one or more database management systems (DBMS) 718 configured to access the memory 706 and/or one or more external datastores 726; and one or more program modules, applications, engines, managers, computer-executable code, scripts, or the like such as, for example, a transaction routing control layer 720, one or more affinity record management modules 722, and one or more back-end data replication modules 724. Any of the components depicted as being stored in data storage 714 may include any combination of software, firmware, and/or hardware. The software and/or firmware may include computer-executable instructions (e.g., computer-executable program code) that may be loaded into the memory 706 for execution by one or more of the processor(s) 704 to perform any of the operations described earlier in connection with correspondingly named modules.

Although not depicted in FIG. 7, the data storage 714 may further store various types of data utilized by components of the active-active transaction protocol server 702 (e.g., data stored in the datastore(s) 726). Any data stored in the data storage 714 may be loaded into the memory 706 for use by the processor(s) 704 in executing computer-executable instructions. In addition, any data stored in the data storage 714 may potentially be stored in the external datastore(s) 726 and may be accessed via the DBMS 718 and loaded in the memory 706 for use by the processor(s) 704 in executing computer-executable instructions.

The processor(s) 704 may be configured to access the memory 706 and execute computer-executable instructions loaded therein. For example, the processor(s) 704 may be configured to execute computer-executable instructions of the various program modules, applications, engines, managers, or the like of the active-active transaction protocol server 702 to cause or facilitate various operations to be performed in accordance with one or more embodiments of the disclosure. The processor(s) 704 may include any suitable processing unit capable of accepting data as input, processing the input data in accordance with stored computer-executable instructions, and generating output data. The processor(s) 704 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 704 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 704 may be capable of supporting any of a variety of instruction sets.

Referring now to other illustrative components depicted as being stored in the data storage 714, the O/S 716 may be loaded from the data storage 714 into the memory 706 and may provide an interface between other application software executing on the active-active transaction protocol server 702 and hardware resources of the active-active transaction protocol server 702. More specifically, the O/S 716 may include a set of computer-executable instructions for managing hardware resources of the active-active transaction protocol server 702 and for providing common services to other application programs. In certain example embodiments, the O/S 716 may include or otherwise control the execution of one or more of the program modules, engines, managers, or the like depicted as being stored in the data storage 714. The O/S 716 may include any operating system now known or which may be developed in the future including, but not limited to, any server operating system, any mainframe operating system, or any other proprietary or non-proprietary operating system.

The DBMS 718 may be loaded into the memory 706 and may support functionality for accessing, retrieving, storing, and/or manipulating data stored in the memory 706, data stored in the data storage 714, and/or data stored in external datastore(s) 726. The DBMS 718 may use any of a variety of database models (e.g., relational model, object model, etc.) and may support any of a variety of query languages. The DBMS 718 may access data represented in one or more data schemas and stored in any suitable data repository. Data stored in the datastore(s) 726 may include, for example, transaction routing tables, affinity records, data records, and so forth. Datastore(s) 726 that may be accessible by the active-active transaction protocol server 702 via the DBMS 718 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the active-active transaction protocol server 702, the input/output (I/O) interface(s) 708 may facilitate the receipt of input information by the active-active transaction protocol server 702 from one or more I/O devices as well as the output of information from the active-active transaction protocol server 702 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the active-active transaction protocol server 702 or may be separate. The I/O devices may further include, for example, any number of peripheral devices such as data storage devices, printing devices, and so forth.

The I/O interface(s) 708 may also include an interface for an external peripheral device connection such as universal serial bus (USB), FireWire, Thunderbolt, Ethernet port or other connection protocol that may connect to one or more networks. The I/O interface(s) 708 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The active-active transaction protocol server 702 may further include one or more network interfaces 710 via which the active-active transaction protocol server 702 may communicate with any of a variety of other systems, platforms, networks, devices, and so forth. The network interface(s) 710 may enable communication, for example, with one or more other devices via one or more of the network(s) 732.

The transaction server 728 and/or the client device 730 may include similar software and/or hardware components as the active-active transaction protocol server 702. It should be appreciated, however, that functionality described as being provided by a particular component of the architecture 700 may be provided by a different component or distributed among multiple components. For example, components depicted as residing on the active-active transaction protocol server 702 may reside, at least in part, on the transaction server 728 and/or the client device 730. Similarly, any functionality described as being performed by the transaction server 728 and/or the client device 730 may be performed, at least in part, by the active-active transaction protocol server 702.

It should be appreciated that the program modules/engines depicted in FIG. 7 as being stored in the data storage 714 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the active-active transaction protocol server 702 and/or other computing devices accessible via one or more networks, may be provided to support functionality provided by the modules depicted in FIG. 3 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 7 may be implemented, at least partially, in hardware and/or firmware across any number of devices.

It should further be appreciated that the active-active transaction protocol server 702 may include alternate and/or additional hardware, software, or firmware components beyond those described or depicted without departing from the scope of the disclosure. More particularly, it should be appreciated that software, firmware, or hardware components depicted as forming part of the active-active transaction protocol server 702 are merely illustrative and that some components may not be present or additional components may be provided in various embodiments. While various illustrative modules have been depicted and described as software modules stored in data storage 714, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of any of the methods 400-600 may be performed, at least in part, by an active-active transaction protocol server 702 having the illustrative configuration depicted in FIG. 7, or more specifically, by one or more program modules, engines, applications, or the like executable on such a device. It should be appreciated, however, that such operations may be implemented in connection with numerous other device configurations and may be performed, at least in part, by other components of the architecture 700 such as the transaction server 728 and/or the client device 730.

The operations described and depicted in the illustrative method of FIGS. 4A, 4B, 5, and 6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 4A, 4B, 5, and 6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for implementing an active-active transaction protocol for multiple sites, the method comprising:
    receiving a transaction at a first transaction routing control layer associated with a first site, wherein the transaction comprises a modification to a first data record and a modification to a second data record, and wherein the first data record and the second data record are each stored at the first site and a second site;
    determining that no affinity record exists for the first data record or the second data record;
    transferring a transaction control flow to a second transaction routing control layer associated with the second site;
    generating and storing, at the second site, a first affinity record corresponding to the first data record and the transaction and a second affinity record corresponding to the second data record and the transaction, wherein the first affinity record and the second affinity record each point to the first site;
    transferring the transaction control flow back to the first transaction routing control layer;
    generating and storing, at the first site, a third affinity record corresponding to the first data record and the transaction and a fourth affinity record corresponding to the second data record and the transaction, wherein the third affinity record and the fourth affinity record each point to the first site; and
    routing the transaction to a first transaction server associated with the first site to initiate execution of the transaction.

2. The computer-implemented method of claim 1, further comprising:
    executing, by the first transaction server, the transaction at least in part by instructing a database manager associated with the first site to modify the first data record and the second data record stored at the first site in accordance with the transaction; and
    replicating, by a back-end data replication component, the modifications to the first data record and the second data record stored at the first site to the first data record and the second data record stored at the second site.

3. The computer-implemented method of claim 2, further comprising:
    sending, by the first transaction server, a timestamp indicating a completion time of execution of the transaction to the first transaction routing control layer;
    updating the first affinity record and the second affinity record to include the timestamp;
    transferring the transaction control flow to the second transaction routing control layer; and
    updating the third affinity record and the fourth affinity record to include the timestamp.

4. The computer-implemented method of claim 2, further comprising:
    sending, by the first transaction routing control layer, a query to the back-end data replication component;
    determining, based at least in part on a response received to the query, that replication of the modifications to the first data record and the second data record stored at the first site to the first data record and the second data record stored at the second site is complete; and
    discarding the first affinity record and the second affinity record.

5. The computer-implemented method of claim 1, wherein the transaction is a first transaction, the method further comprising:
    receiving a second transaction at the second transaction routing control layer, wherein the second transaction comprises a further modification to the first data record;
    determining that the first affinity record corresponding to the first data record has already been generated;
    generating and storing, at the second site, a first new affinity record corresponding to the first data record and the second transaction, wherein the first new affinity record points to the first site based at least in part on the first affinity record pointing to the first site; and
    routing the second transaction to the first transaction routing control layer for further processing and execution.

6. The computer-implemented method of claim 1, wherein the transaction is a first transaction, the method further comprising:
    receiving, at the first transaction routing control layer, a second transaction, wherein the second transaction comprises a further modification to the first data record and a modification to a third data record;
    determining that the first affinity record corresponding to the first data record and pointing to the first site has already been generated;
    determining that a fifth affinity record corresponding to the third data record and pointing to the second site has already been generated; and
    determining that a target site conflict exists between the first affinity record and the fifth affinity record.

7. The computer-implemented method of claim 6, further comprising:
    waiting a predetermined period of time for the target site conflict to be resolved;

after waiting the predetermined period of time, determining that the target site conflict has been resolved based at least in part on determining that the first affinity record has been discarded;

generating and storing, at the first site, a first new affinity record corresponding to the first data record and the second transaction and a second new affinity record corresponding to the third data record and the second transaction, wherein the first new affinity record and the second new affinity record each point to the second site based at least in part on the fifth affinity record pointing to the second site; and routing the second transaction to the first transaction routing control layer for further processing and execution.

8. The computer-implemented method of claim 6, further comprising:

generating and storing, at the first site, a first new affinity record corresponding to the first data record and the second transaction, wherein the first new affinity record points to the first site based at least in part on the first affinity record pointing to the first site;

generating and storing, at the first site, a second new affinity record corresponding to the third data record and the second transaction, wherein the second new affinity record points to the first site and includes an exception;

routing the second transaction to the first transaction routing control layer for further processing and execution; and performing, by the back-end data replication component, exception handling for the third data record based at least in part on the exception.

9. A system for implementing an active-active transaction protocol for multiple sites, the system comprising:

at least one memory storing computer-executable instructions; and at least one processor, wherein the at least one processor is configured to access the at least one memory and execute the computer-executable instructions to:

receive a transaction at a first transaction routing control layer associated with a first site, wherein the transaction comprises a modification to a first data record and a modification to a second data record, and wherein the first data record and the second data record are each stored at the first site and a second site;

determine that no affinity record exists for the first data record or the second data record;

transfer a transaction control flow to a second transaction routing control layer associated with the second site;

generate and store, at the second site, a first affinity record corresponding to the first data record and the transaction and a second affinity record corresponding to the second data record and the transaction, wherein the first affinity record and the second affinity record each point to the first site;

transfer the transaction control flow back to the first transaction routing control layer;

generate and store, at the first site, a third affinity record corresponding to the first data record and the transaction and a fourth affinity record corresponding to the second data record and the transaction, wherein the third affinity record and the fourth affinity record each point to the first site; and route the transaction to the first site to initiate execution of the transaction.

10. The system of claim 9, wherein the at least one processor is further configured to execute the computer-executable instructions to:

execute, at the first site, the transaction at least in part by instructing a database manager associated with the first site to modify the first data record and the second data record stored at the first site in accordance with the transaction; and perform back-end data replication of the modifications to the first data record and the second data record stored at the first site to the first data record and the second data record stored at the second site.

11. The system of claim 10, wherein the at least one processor is further configured to execute the computer-executable instructions to:

send a timestamp indicating a completion time of execution of the transaction at the first site to the first transaction routing control layer;

update the first affinity record and the second affinity record to include the timestamp;

transfer the transaction control flow to the second transaction routing control layer; and update the third affinity record and the fourth affinity record to include the timestamp.

12. The system of claim 10, wherein the at least one processor is further configured to execute the computer-executable instructions to:

send, from the first transaction routing control layer, a query to a back-end data replication component;

determine, based at least in part on a response received to the query, that replication of the modifications to the first data record and the second data record stored at the first site to the first data record and the second data record stored at the second site is complete; and discard the first affinity record and the second affinity record.

13. The system of claim 9, wherein the transaction is a first transaction, and wherein the at least one processor is further configured to execute the computer-executable instructions to:

receive a second transaction at the second transaction routing control layer, wherein the second transaction comprises a further modification to the first data record;

determine that the first affinity record corresponding to the first data record has already been generated;

generate and store, at the second site, a first new affinity record corresponding to the first data record and the second transaction, wherein the first new affinity record points to the first site based at least in part on the first affinity record pointing to the first site; and route the second transaction to the first transaction routing control layer for further processing and execution.

14. The system of claim 9, wherein the transaction is a first transaction, and wherein the at least one processor is further configured to execute the computer-executable instructions to:

receive, at the first transaction routing control layer, a second transaction, wherein the second transaction comprises a further modification to the first data record and a modification to a third data record;

determine that the first affinity record corresponding to the first data record and pointing to the first site has already been generated;

determine that a fifth affinity record corresponding to the third data record and pointing to the second site has already been generated; and determine that a target site conflict exists between the first affinity record and the fifth affinity record.

15. The system of claim 14, wherein the at least one processor is further configured to execute the computer-executable instructions to:

wait a predetermined period of time for the target site conflict to be resolved;

after waiting the predetermined period of time, determine that the target site conflict has been resolved based at least in part on determining that the first affinity record has been discarded;

generate and store, at the first site, a first new affinity record corresponding to the first data record and the second transaction and a second new affinity record corresponding to the third data record and the second transaction, wherein the first new affinity record and the second new affinity record each point to the second site based at least in part on the fifth affinity record pointing to the second site; and route the second transaction to the first transaction routing control layer for further processing and execution.

16. The system of claim 14, wherein the at least one processor is further configured to execute the computer-executable instructions to:

generate and store, at the first site, a first new affinity record corresponding to the first data record and the second transaction, wherein the first new affinity record points to the first site based at least in part on the first affinity record pointing to the first site;

generate and store, at the first site, a second new affinity record corresponding to the third data record and the second transaction, wherein the second new affinity record points to the first site and includes an exception;

route the second transaction to the first transaction routing control layer for further processing and execution; and perform back-end exception handling for the third data record based at least in part on the exception.

17. A computer program product for implementing an active-active transaction protocol for multiple sites, the computer program product comprising a storage medium readable by a processing circuit, the storage medium storing instructions executable by the processing circuit to cause a method to be performed, the method comprising:

receiving a transaction at a first transaction routing control layer associated with a first site, wherein the transaction comprises a modification to a first data record and a modification to a second data record, and wherein the first data record and the second data record are each stored at the first site and a second site;

determining that no affinity record exists for the first data record or the second data record;

transferring a transaction control flow to a second transaction routing control layer associated with the second site;

generating and storing, at the second site, a first affinity record corresponding to the first data record and the transaction and a second affinity record corresponding to the second data record and the transaction, wherein the first affinity record and the second affinity record each point to the first site;

transferring the transaction control flow back to the first transaction routing control layer;

generating and storing, at the first site, a third affinity record corresponding to the first data record and the transaction and a fourth affinity record corresponding to the second data record and the transaction, wherein the third affinity record and the fourth affinity record each point to the first site; and routing the transaction to a first transaction server associated with the first site to initiate execution of the transaction.

18. The computer program product of claim 17, the method further comprising:

executing, by the first transaction server, the transaction at least in part by instructing a database manager associated with the first site to modify the first data record and the second data record stored at the first site in accordance with the transaction; and replicating, by a back-end data replication component, the modifications to the first data record and the second data record stored at the first site to the first data record and the second data record stored at the second site.

19. The computer program product of claim 18, wherein the transaction is a first transaction, the method further comprising:

receiving, at the first transaction routing control layer, a second transaction, wherein the second transaction comprises a further modification to the first data record and a modification to a third data record;

determining that the first affinity record corresponding to the first data record and pointing to the first site has already been generated;

determining that a fifth affinity record corresponding to the third data record and pointing to the second site has already been generated; and determining that a target site conflict exists between the first affinity record and the fifth affinity record.

20. The computer program product of claim 19, the method further comprising:

waiting a predetermined period of time for the target site conflict to be resolved;

after waiting the predetermined period of time, determining that the target site conflict has been resolved based at least in part on determining that the first affinity record has been discarded;

generating and storing, at the first site, a first new affinity record corresponding to the first data record and the second transaction and a second new affinity record corresponding to the third data record and the second transaction, wherein the first new affinity record and the second new affinity record each point to the second site based at least in part on the fifth affinity record pointing to the second site; and routing the second transaction to the first transaction routing control layer for further processing and execution.

* * * * *

UNITED STATES PATENT AND TRADEMARK OFFICE
CERTIFICATE OF CORRECTION

PATENT NO. : 10,949,416 B2  
APPLICATION NO. : 16/034651  
DATED : March 16, 2021  
INVENTOR(S) : Si Bin Fan et al.

Page 1 of 1

It is certified that error appears in the above-identified patent and that said Letters Patent is hereby corrected as shown below:

On the Title Page

Column 1, (72) Inventors: Line 5, should read as follows:  
Si Bin FAN, Beijing, China;  
Wei LIU, Beijing, China;  
Mai ZENG, Beijing, China;  
Wen Z. LIU, Beijing, China;  
Wei LI, Beijing, China;  
Yi Jie MA, Beijing, China;  
Zhi D. HAO, Beijing, China;  
Hong Tao LI, Beijing, China;  
Jiong FAN, Beijing, China;  
Wei H. LIU, Beijing, China Signed and Sealed this  
Twentieth Day of July, 2021

Drew Hirshfeld  
*Performing the Functions and Duties of the*  
*Under Secretary of Commerce for Intellectual Property and*  
*Director of the United States Patent and Trademark Office*